United States Patent
Suzuki et al.

(10) Patent No.: US 8,985,766 B2
(45) Date of Patent: Mar. 24, 2015

(54) METHOD FOR DESIGNING SPECTACLE LENSES

(75) Inventors: Masaya Suzuki, Okazaki (JP); Mizuki Nagae, Okazaki (JP); Takashi Kuramata, Okazaki (JP)

(73) Assignee: Tokai Optical Co. Ltd., Aichi (JP)

( * ) Notice: Subject to any disclaimer, the term of this patent is extended or adjusted under 35 U.S.C. 154(b) by 1007 days.

(21) Appl. No.: 12/998,182

(22) PCT Filed: Sep. 23, 2009

(86) PCT No.: PCT/JP2009/066463
§ 371 (c)(1),
(2), (4) Date: Mar. 23, 2011

(87) PCT Pub. No.: WO2010/035726
PCT Pub. Date: Apr. 1, 2010

(65) Prior Publication Data
US 2011/0170058 A1    Jul. 14, 2011

(30) Foreign Application Priority Data

Sep. 24, 2008 (JP) ................................. 2008-243655

(51) Int. Cl.
*G02C 3/00* (2006.01)
*G02C 7/06* (2006.01)
*G02C 7/02* (2006.01)

(52) U.S. Cl.
CPC ............... *G02C 7/061* (2013.01); *G02C 7/027* (2013.01)
USPC .................................................. 351/159.74

(58) Field of Classification Search
USPC ............... 351/159.73–159.76, 200, 205, 216, 351/217, 222, 229, 234, 246
See application file for complete search history.

(56) References Cited

U.S. PATENT DOCUMENTS

| 6,491,394 | B1 * | 12/2002 | Blum et al. ................... 351/228 |
| 6,637,880 | B1 | 10/2003 | Yamakaji et al. |
| 2005/0157258 | A1 | 7/2005 | Shinohara et al. |

FOREIGN PATENT DOCUMENTS

| JP | 2005-202292 | 7/2005 |
| JP | 2006-506667 | 2/2006 |
| JP | 2006-072192 | 3/2006 |
| JP | 2008-250441 | 10/2008 |
| WO | 00-48035 | 8/2000 |
| WO | 2004-046792 | 6/2004 |

OTHER PUBLICATIONS

International Search Report and Written Opinion of the International Search Authority in International Application No. PCT/JP2009/066463 (4 pages total).

* cited by examiner

*Primary Examiner* — James Greece
(74) *Attorney, Agent, or Firm* — Martine Penilla Group, LLP

(57) ABSTRACT

A plurality of to-be-evaluated lenses that differ in lens surface design from one another is prepared in an evaluation-value calculating step. Thereafter, a subject's predetermined biological information, e.g., brain waves, is measured for each of the to-be-evaluated lenses by allowing the subject to wear each of the lenses, and an evaluation value for each of the lenses is calculated relative to a predetermined index in the brain waves, for example, relative to a "state of being under stress." Thereafter, a correlation between the calculated evaluation value and a lens surface shape is calculated as an index characteristic in a lens-surface-shape determining step. Thereafter, a lens surface shape of a suitable spectacle lens in the index is determined based on the index characteristic, and the lens surface shape is fed back as a shape of a to-be-evaluated lens of the evaluation-value calculating step.

19 Claims, 10 Drawing Sheets

(a)

(b)

METHOD FOR DESIGNING SPECTACLE LENSES

TECHNICAL FIELD

The present invention relates to a method for designing spectacle lenses.

BACKGROUND ART

A spectacle lens is usually designed through a simulation step and an evaluation step thereof. In the simulation step, an eyeball model and a lens shape are constructed by a computer according to computer simulations, a beam of light that has passed through a lens is then evaluated, and the lens shape is optimized so as to bring its evaluation result close to a desired value. Based on a design value designed in the simulation step, a lens to be evaluated (hereinafter, referred to as a "to-be-evaluated lens") is actually produced, and optical measurement, shape confirmation, and monitor spectacles-wearing evaluation are performed in the evaluation step. Thereafter, improvements in design are advanced in such a way that the result obtained in the evaluation step is again fed back to the desired value of the simulation step. The "optical measurement" denotes that the produced to-be-evaluated lens is evaluated about whether the lens is the same in optical characteristics as a simulated one, and the "shape confirmation" denotes that the produced to-be-evaluated lens is likewise evaluated about whether the lens has been formed in accordance with a lens surface shape corresponding to data designed by the computer by actually performing tracing by use of, for example, a three-dimensional shape tracer, and the "monitor spectacles-wearing evaluation" denotes that a subject's impression received by actually wearing spectacles having the produced to-be-evaluated lenses is evaluated. Patent documents 1 and 2 can be mentioned as examples of prior arts disclosed with respect to a method for designing spectacle lenses and its evaluation.

Herein, when a spectacle lens is designed, this lens can be designed with the expectation that a sensation felt when spectacles are worn will be improved to some extent by a computer simulation. However, after all, a judgment about whether such a spectacles-wearing sensation is good or bad cannot be made until the spectacles are actually worn, and therefore the importance of the monitor spectacles-wearing evaluation occupies a large percentage in the evaluation step. Especially in a progressive power lens, there are many cases in which a larger-than-expected difference is felt between a design imaginarily set by a computer simulation and a sensation given when spectacles using the progressive power lenses are actually worn, and therefore the monitor spectacles-wearing evaluation is important.

Patent Document 1: Japanese Published Unexamined Patent Application No. 2006-72192
Patent Document 2: Japanese Translation of International Application No. 2006-506667

DISCLOSURE OF THE INVENTION

Problems to be Solved by the Invention

However, all factors exerting on a sensation felt when spectacles are worn have not been revealed, and this sensation often depends on each person or is felt differently according to each person's subjective view, and therefore it has been difficult to concretely calculate this sensation from a monitor result. In other words, a monitor result is very vague, and therefore, after all, the manner in which the monitor result is reflected in lens design has depended on lens designer's experiences in many cases. Therefore, a method has been required for objectively evaluating a spectacles-wearing sensation of a monitor and reflecting the resulting evaluation in design.

The present invention has been made in consideration of these problems residing in the conventional techniques, and it is an object of the present invention to provide a method for designing spectacle lenses capable of objectively evaluating a sensation felt when a subject actually wears spectacles having to-be-evaluated lenses and capable of reflecting a result obtained by evaluating the sensation in lens design.

Means for Solving the Problems

To solve the above-mentioned problems, the invention of claim 1 is characterized by comprising an evaluation-value calculating step of preparing a plurality of to-be-evaluated lenses for lens surface design performed differently from each other, thereafter measuring predetermined biological information of a subject for each of the to-be-evaluated lenses by allowing the subject to wear each of the to-be-evaluated lenses, and calculating an evaluation value of each of the to-be-evaluated lenses with respect to a predetermined index in the biological information; and a lens-surface-shape determining step of calculating a correlation between an evaluation value of each of the to-be-evaluated lenses calculated in the evaluation-value calculating step and a lens surface shape of each of the to-be-evaluated lenses as an index characteristic, and determining a lens surface shape of a spectacle lens suitable in the index based on the index characteristic.

The invention of claim 2 is characterized in that, in addition to the structure of the invention of claim 1, one of the plurality of to-be-evaluated lenses has a lens surface shape determined in the lens-surface-shape determining step.

The invention of claim 3 is characterized in that, in addition to the structure of the invention of claim 1 or 2, a plurality of indexes each of which is defined in claim 1 are prepared, and a specific weight is assigned to an evaluation value obtained in each of the indexes.

The invention of claim 4 is characterized in that, in addition to the structure of the invention of any one of claims 1 to 3, when an index characteristic is calculated in the lens-surface-shape determining step, a value obtained by normalizing an evaluation value of each of the to-be-evaluated lenses calculated in the evaluation-value calculating step is used.

The invention of claim 5 is characterized in that, in addition to the structure of the invention of claim 4, an evaluation value is calculated relative to a reference lens having a differently-felt spectacles-wearing sensation in which a noticeable evaluation value is obtained in comparison with the to-be-evaluated lenses in the evaluation-value calculating step, and the evaluation value of the reference lens is set as a reference value in the lens-surface-shape determining step.

The invention of claim 6 is characterized in that, in addition to the structure of the invention of any one of claims 1 to 5, a design starting lens is set, thereafter a difference in shape between each of the to-be-evaluated lenses and the design starting lens is calculated as a difference vector in the evaluation-value calculating step, and, based on this difference vector and based on an evaluation value calculated relative to a predetermined index in the evaluation-value calculating step, a difference vector whose evaluation value becomes larger than that of the design starting lens is calculated, and an amount of change corresponding to the difference vector is combined with the design starting lens.

The invention of claim 7 is characterized in that, in addition to the structure of the invention of claim 6, the difference vector whose evaluation value becomes larger than that of the design starting lens is an optimal difference vector whose evaluation value in the index becomes a maximum value.

The invention of claim 8 is characterized in that, in addition to the structure of the invention of claim 6 or 7, the design starting lens with which an amount of change corresponding to its difference vector has been combined is set as a new design starting lens.

The invention of claim 9 is characterized in that, in addition to the structure of the invention of any one of claims 1 to 8, the subject is a person who desires to purchase spectacle lenses, and the biological information is measured at a spectacle-lens retail store or at an ophthalmology department.

The invention of claim 10 is characterized in that, in addition to the structure of the invention of claim 9, the biological information measured at the spectacle-lens retail store or at the ophthalmology department is transmitted to a lens processing place through a means of communication, and the lens-surface-shape determining step is performed at the lens processing place.

The invention of claim 11 is characterized in that, in addition to the structure of the invention of claim 9, the evaluation-value calculating step is performed with respect to the biological information measured at the spectacle-lens retail store or at the ophthalmology department, thereafter a resulting evaluation value is transmitted to the lens processing place through a means of communication, and the lens-surface-shape determining step is performed at the lens processing place.

The invention of claim 12 is characterized in that, in addition to the structure of the invention of any one of claims 1 to 11, the predetermined biological information is brain waves.

The invention of claim 13 is characterized in that, in addition to the structure of the invention of any one of claims 1 to 11, the predetermined biological information is at least one selected from an amount of oxygenated hemoglobin in brain blood, an amount of deoxygenated hemoglobin in the brain blood, and an amount of all hemoglobin in the brain blood.

The invention of claim 14 is characterized in that, in addition to the structure of the invention of any one of claims 1 to 13, the spectacle lens is a progressive power lens.

In the structures formed as above, a subject is first allowed to wear a plurality of to-be-evaluated lenses that differ in lens surface design, and subject's predetermined biological information is measured for each of the to-be-evaluated lenses in the evaluation-value calculating step. Preferably, measurement is performed a plurality of times for each lens, and, if this is performed a plurality of times, the order of measurement should not be fixed, because errors in measurement can be canceled. Additionally, it is permissible to obtain not only the measurement result of one subject but also the measurement results of a plurality of subjects. Specific limitations are not imposed on the number of to-be-evaluated lenses, and the use of about two to five kinds of to-be-evaluated lenses is appropriate, because too much time is consumed if too many lenses are used.

With respect to the lens surface shape of a to-be-evaluated lens, a plurality of designs extracted at random may be adopted, or a plurality of designs in which an amount of difference deformation has been added to a lens surface shape that serves as the start of design may be adopted. The term "extracted at random" mentioned in the former part of the preceding compound sentence denotes that a to-be-evaluated lens is selected at random without especially providing a direction, and, as a result, the performance of a spectacle lens can be widely searched. If the "amount of difference deformation" mentioned in the latter part of the preceding compound sentence is added, the feedback to a design process can be more clarified, because the shape added thereto fixes the direction of design. It is preferable to use the "random extraction" of the former part and the "addition of an amount of difference deformation to a shape" of the latter part together, and, as a result, accuracy in design is heightened. However, only the "random extraction" of the former part may be performed, or only the "addition of an amount of difference deformation to a shape" of the latter part may be performed.

Preferably, in addition to design lenses to be evaluated, one kind of reference lens having a differently-felt spectacles-wearing sensation that can obtain a noticeable evaluation value in comparison with to-be-evaluated lenses is added for evaluation. The reason is that it is possible to determine whether a brain-wave measurement result obtained by this is an error in measurement or is a lens performance.

Examples of biological information include subject's brain waves, amount of oxygenated hemoglobin in the brain blood, amount of deoxygenated hemoglobin in the brain blood, amount of all hemoglobin in the brain blood, myoelectric potential, ocular movement, blink, body temperature, heart rate, blood pressure, perspiration function, and salivary components, which are regarded as being relative to a sensation. First, a change in these pieces of biological information is measured by a measuring device, so that a given numerical value (measured value) is obtained. If a measured value of biological information does not undergo any processing, the meaning of the measured value will not be understood. In other words, the measured value is not expressed as a numerical value by which an evaluation of whether the lens is good or bad can be made, and therefore direction is required to be given to the measured value. This is expressed as an "index" in the present invention. Herein, the term "index" denotes a criterion for judging the state of a sensation felt when viewing through a lens is performed, such as "state of being under stress," "state of being relaxed," "state of being pleased," "state of being revolted," "state of being clearly discernible" or "state of being blurred." With respect to such a predetermined index in biological information, an evaluation value is calculated for each of the to-be-evaluated lenses.

To obtain an evaluation value, it is necessary to collect biological information data in the state of an index for each index beforehand, thereafter standardize the collected biological information data, and set a pattern that serves as a reference. Herein, the term "to standardize" denotes that an amount of change of the state of an index and an amount of change of measured biological information are correlated with each other, and, in "standardizing," it is preferable to use data that has undergone "normalizing" to compare amounts of biological information measured for each subject by use of the same scale for "standardizing." The "normalizing" is a process for comparing amounts of biological information measured while using the same criterion even when there are different subjects or even when the same subject is in a different physical condition. For example, the "normalizing" is to convert measured biological information data so as to set the mean value and the variance value of the measured biological information data at predetermined values. For example, many pieces of data are collected in an environment in which stress is actually imposed or an opposite environment in which stress does not exist, and a pattern that serves as a reference is obtained by standardizing the "state of being under stress," and, as a result, a quantitative evaluation value of the "state of being under stress" can be obtained with respect to a certain arbitrary measured value.

Thereafter, in a lens-surface-shape determining step, a correlation between an evaluation value of each of the to-be-evaluated lenses calculated in the evaluation-value calculating step and a lens surface shape of each of the to-be-evaluated lenses is calculated as an index characteristic. Thereafter, a suitable lens surface shape of the spectacle lens in the index is determined based on the index characteristic. For example, a fixed scatter diagram can be obtained by graphing the relationship between the lens surface shape and the evaluation value of the to-be-evaluated lens. A fixed tendency can be obtained from its scatter state, and therefore a suitable lens surface shape of the spectacle lens in the index can be determined by analyzing this tendency. Alternatively, it is also possible to simply select a lens surface shape of a to-be-evaluated lens having the best calculation value from a plurality of to-be-evaluated lenses.

Herein, if there are a plurality of indexes, evaluation values of the plurality of indexes can be employed, and, in this case, a specific weight can be assigned to an evaluation value obtained for each index. The "weight" is set for a designer's design objective, i.e., is set for aiming to reflect what type of design is intended. A method for setting the weight may be determined by a designer in accordance with the designer's objective, or may be automatically determined from an obtained measurement result by calculations.

Preferably, vectors are used as a technique for calculating the index characteristic. A calculation can be easily performed by regarding differences given to reference points (measurement points) placed on many lenses as multi-dimensional vectors. More specifically, as a possible way, a difference in shape between each to-be-evaluated lens and a design starting lens is calculated as a difference vector, and, based on this difference vector and based on an evaluation value calculated relative to a predetermined index in the evaluation-value calculating step, a difference vector whose evaluation value becomes larger than the design starting lens is calculated, and an amount of change corresponding to the difference vector is combined with the design starting lens. If a maximum value is obtained in this case, it is preferable to use this maximum value as an optimal difference vector.

The lens surface shape determined in this way is fed back to the evaluation-value calculating step. In other words, an amount of change corresponding to a difference vector is combined with the design starting lens, and then the design starting lens combined therewith is set as a new design starting lens, and a similar process is again performed, and, as a result, it becomes possible to obtain a more suitable lens surface shape.

It is conceivable that there are two cases in one of which a subject is a monitor wearer at a lens development stage and in the other one of which a subject is a person who desires to purchase spectacle lenses designed and produced by reflecting subject's biological information in lens design.

Preferably, biological information is measured at a spectacle-lens retail store or at an ophthalmology department if a subject is a person who desires to purchase spectacle lenses.

Preferably, biological information measured at the spectacle-lens retail store or at the ophthalmology department is transmitted to a lens processing place through a means of communication, and the lens-surface-shape determining step is performed at the lens processing place. Herein, the term "means of communication" is a concept that widely includes data transmission by a communication network (VAN (Value Added Network) using terminal computers, the Internet, or WAN (Wide Area Network), etc.,) and transmission of a sheet on which measurement results are written by a facsimile machine. The "lens processing place" denotes, for example, a lens processing atelier or a lens maker.

Preferably, the evaluation-value calculating step is performed for biological information measured at the spectacle-lens retail store or at the ophthalmology department, and evaluation values obtained in this step are transmitted to the lens processing place through a means of communication, and the lens-surface-shape determining step is performed at the lens processing place.

As described above, the biological information of a person who desires to purchase spectacle lenses or the data of its evaluation values is transmitted to the lens processing place through a means of communication, and a lens surface shape is determined in the lens-surface-shape determining step, and a lens having this lens surface shape is produced, and, as a result, a spectacle lens suitable for the person who desires to purchase spectacle lenses can be produced and provided to this person.

Effects of the Invention

In the invention of each claim mentioned above, it is possible to objectively evaluate whether a sensation felt when a subject wears spectacles having to-be-evaluated lenses is good or bad, and therefore it is possible to design a lens having a more suitable lens surface shape in which the evaluation results are reflected.

BEST MODE FOR CARRYING OUT THE INVENTION

Concrete embodiments of the present invention will be hereinafter described with reference to the drawings.

Embodiment 1

Figure 1:
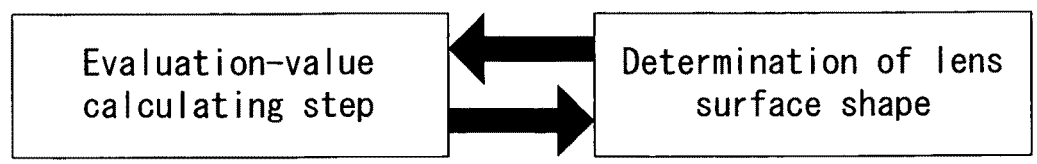
FIG. 1 is a flowchart for describing the flow of processing steps in a first embodiment of the present invention.

A first embodiment (Embodiment 1) consists mainly of an evaluation-value calculating step and a lens-surface-shape determining step as shown in FIG. 1, and is characterized in that an optimal progressive power lens is designed by repeatedly performing feedback in which a new design lens obtained in the lens-surface-shape determining step is again used as a to-be-evaluated lens in the evaluation-value calculating step.

1. With Respect to to-be-Evaluated Lenses

Figure 2:
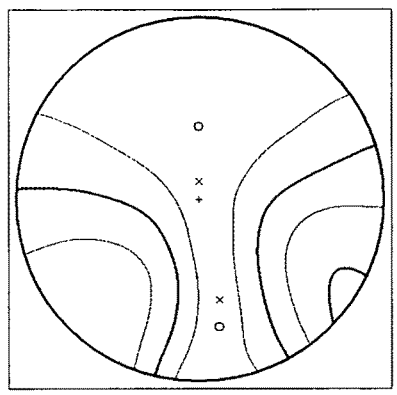
FIG. 2 is an aberration distribution diagram of a to-be-evaluated lens B.
Figure 3:
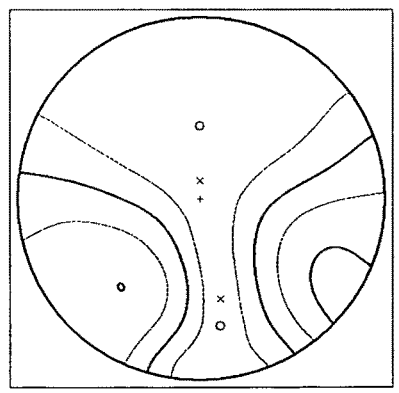
FIG. 3 is an aberration distribution diagram of a to-be-evaluated lens C.
Figure 4:
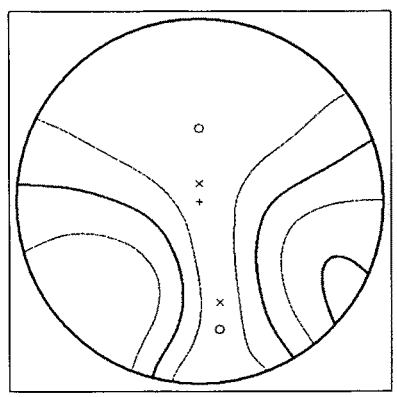
FIG. 4 is an aberration distribution diagram of a to-be-evaluated lens D.

In Embodiment 1, four kinds of lenses, i.e., a reference lens "A" and to-be-evaluated lenses "B" to "D" are used. These lenses have the same lens diopter power for each subject. The to-be-evaluated lens B is a design that serves as a design starting point. With respect to the to-be-evaluated lenses C and D, the to-be-evaluated lens C is formed by adding shape change 1 to the to-be-evaluated lens B, whereas the to-be-evaluated lens D is formed by adding shape change 2 to the to-be-evaluated lens B. The aberration distribution of each of the to-be-evaluated lenses B to D is shown in FIGS. 2 to 4, respectively. The reference lens A is designed to differ substantially in optical performance from the to-be-evaluated lenses B to D, and gives a spectacles-wearing sensation or feeling obviously different from those of the to-be-evaluated lenses B to D in an ordinary subjective-view evaluation. In other words, the reference lens A is a lens which is characterized in that a sensation felt at a glance when a monitor wears spectacles having the reference lenses A is entirely different from those of the to-be-evaluated lenses B to D and which is capable of obtaining an evaluation value substantially different from those of the to-be-evaluated lenses B to D.

A description will now be given of the significance of the formation of lens shapes of the to-be-evaluated lenses C and D by giving a predetermined change in shape to the to-be-evaluated lens B.

Figure 5:
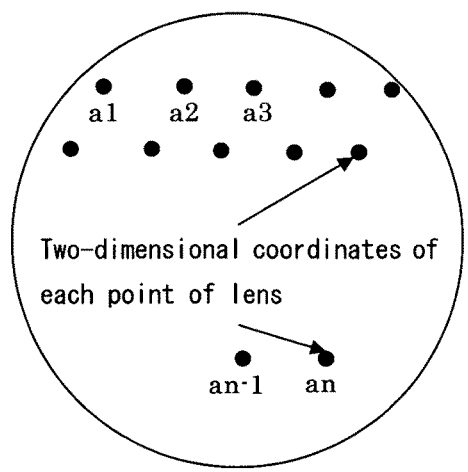
FIG. 5 is a descriptive view for describing a design technique of a lens surface.

As shown in FIG. 5, a plurality of reference points "$a_1$" to "$a_n$" each of which has a clear two-dimensional position are imaginarily set on the to-be-evaluated lens B. Shape data about the entire lens surface can be obtained by performing an interpolation calculation with respect to distances between the reference points $a_1$ to $a_n$.

The shape change 1 given to the lens C can be regarded as an amount of difference deformation ($Cs_1, Cs_2, Cs_3 \ldots, Cs_n$) that is added to each lens reference point ($a_1, a_2, a_3, \ldots, a_n$), for example, under the condition that the lens B serves as a design starting point. Although this amount of difference deformation is, for example, a difference curve value at each point of the lens, this may be a difference sag value, or may be a difference prism value.

At this time, the shape change 1 to be added to the lens B can be set as Cv ($Cs_1, Cs_2, Cs_3 \ldots, Cs_n$), and the shape change 2 can be set as Dv ($Ds_1, Ds_2, Ds_3 \ldots, Ds_n$), each of which is a vector that defines an amount of difference deformation. In other words, a vector Cv having a certain direction is composed of components of an amount of difference deformation of the lens C ($Cs_1, Cs_2, Cs_3 \ldots, Cs_n$), and the degree of difference in shape between the lens B and the lens C can be shown by the direction and the magnitude of the vector Cv. The same applies to the lens D.

In Embodiment 1, as an example, the relation of (vector Cv)=1.8×(vector Dv) is established, i.e., the lens C is set to reach a state of having undergone a shape change of 1.8 times the shape change 2 (vector Dv) added from the lens B to the lens D.

2. With Respect to an Electroencephalograph

In Embodiment 1, brain waves were used as a source for calculating an evaluation value. The electroencephalograph used in Embodiment 1 has an electric structure shown in FIG. 6. A brain-wave detection cephalometric electrode 11 is a well-known device used in, for example, medical treatment, and includes ten electrodes, a ground electrode G, which are shown in FIG. 7 and which conform to the international 10-20 electrode position, and a reference electrode in this embodiment. The brain-wave detection cephalometric electrode 11 is mounted on the head of a subject so as to detect brain waves. An amplifier 12 serves to amplify brain waves detected by the cephalometric electrode 11 and to reduce noise by means of a built-in filter circuit. The brain waves detected thereby are output to an analysis computer 13. The analysis computer 13 is composed of a CPU (central processing unit) 14, a storage device 15, and peripheral devices. The CPU 14 compares and calculates brain-wave data measured based on various programs and based on already-input reference pattern data, and computes evaluation values relative to predetermined indexes about how a subject's sensation state is. Basic programs, such as a program for controlling the operation of the CPU 14 and an OA processing program for managing a function applicable compatibly to a plurality of programs (for example, Japanese-language input function, printing function, etc.), are stored in the storage device 15. Additionally, a program for loading reference pattern data, a program for loading measured values, a program for making a comparison between the measured values and the reference pattern data loaded into the computer, etc., are stored in the storage device 15. Input devices 16 (mouse, keyboard, etc.,) and a monitor 17 are connected to the CPU 14.

3. Measurement of Brain Waves—Calculation of Evaluation Values

Figure 11:
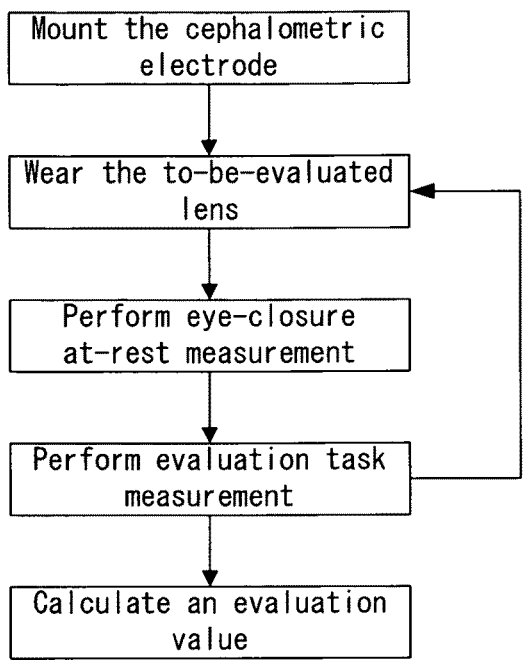
FIG. 11 is a flowchart for describing the flow of an evaluation technique that uses the electroencephalograph.

An evaluation technique using an electroencephalograph will be described with reference to FIG. 11.

First, the brain-wave detection cephalometric electrode 11 is mounted on a subject. Thereafter, the subject is allowed to wear the reference lens A, and data starts to be recorded. With respect to measurement, eye-closure at-rest measurement (about 30 to 60 seconds) and evaluation task measurement (about 30 seconds to 2 minutes) are continuously performed, and then the subject is allowed to wear the to-be-evaluated lens B, and a loop of the flowchart is repeatedly performed in the repetition manner of eye-closure at-rest measurement, evaluation task measurement, . . . until all of the to-be-evaluated lenses end their roles.

The "eye-closure at-rest measurement" denotes the measurement of brain waves performed in a state in which the eyes are being closed, and is used as the background for measurement. The "evaluation task measurement" denotes measurement performed when a task is imposed on a subject, and, as an example, the following task can be imposed; when the performance of a for-far-vision side part of a progressive lens is intended to be evaluated, "subject's gaze is turned to a predetermined point of the for-far-vision side part, and then an indicator of a target (for example, scenery, Landolt ring, etc.,) fixed at a faraway place is viewed." On the other hand, when the usability of a for-near-vision part of the progressive lens is intended to be evaluated, the following task, for example, can be imposed; "targets (for example, newspapers or magazines with which the subject is familiar) that are fixed at a nearby place are viewed in predetermined order." Furthermore, when the deformation or shaking of a spectacle lens is intended to be evaluated, a task having a situation in which such deformation or shaking is easily sensed is imposed. Accordingly, in the evaluation task measurement, the task of using each part of the to-be-evaluated lens in a specific situation is imposed on the subject, and brain waves are measured in such a task state, and, as a result, a manner in which the brain of the subject feels a sensation given when the subject wears spectacles having the to-be-evaluated lenses can be recorded in the form of brain waves.

With respect to the order in which the to-be-evaluated lenses are worn, the reference lens A may be first worn, or each of the lenses A to D may be worn in random order. Furthermore, when measurement is performed a plurality of times or when measurement is performed by using a plurality of subjects, it is preferable to make the order of evaluation random in each measurement, because an influence exerted by the order of measurement can be canceled.

Next, a description will be given of a calculation step of evaluation values relative to predetermined indexes that is performed by the CPU 14 of the electroencephalograph.

Figure 6:
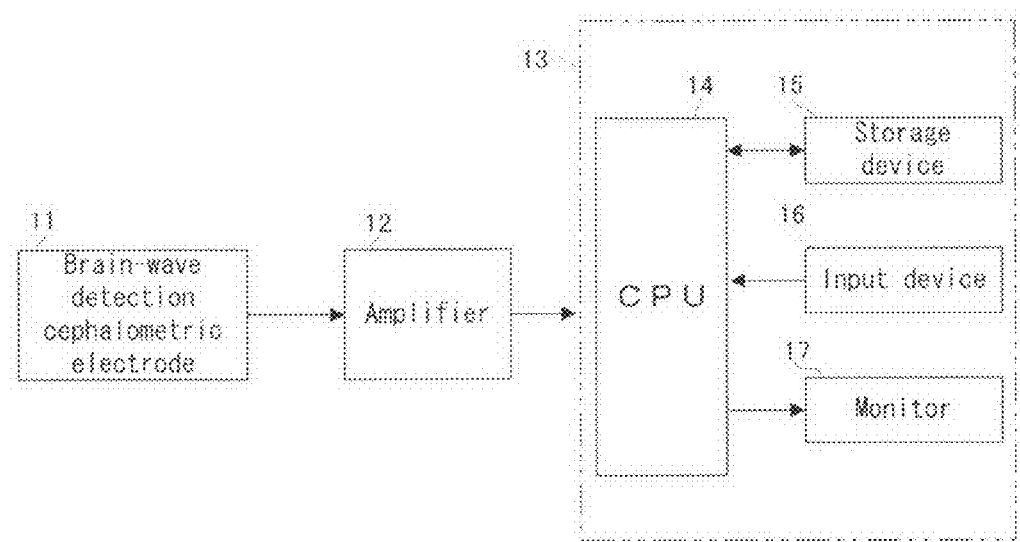
FIG. 6 is a block diagram for describing an electric structure of an electroencephalograph used in the first embodiment.
Figure 7:
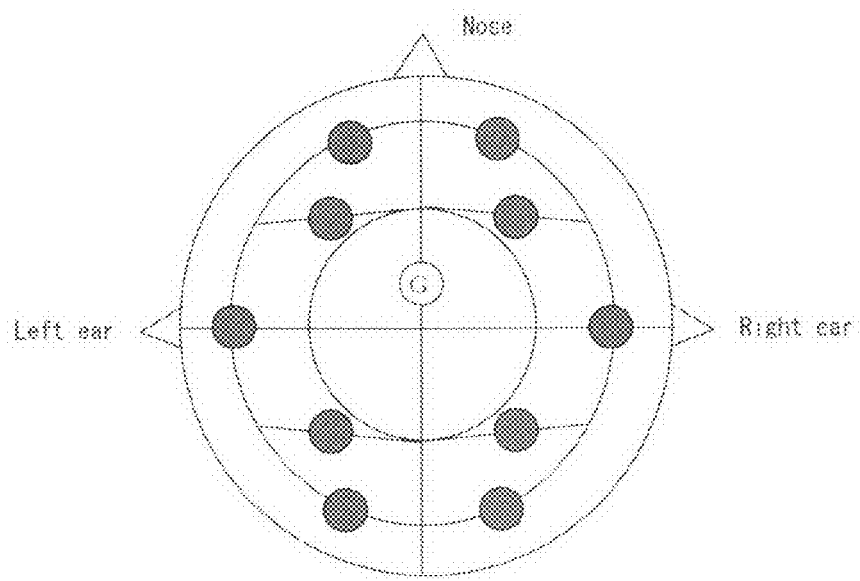
FIG. 7 is a descriptive view for describing an arrangement of brain-wave detection cephalometric electrodes of the electroencephalograph.

The CPU 14 analyzes how much a reference pattern of brain waves in a predetermined index, which is pre-set by, for example, a preliminary experiment and which is recorded in the storage device of FIG. 6, is contained in a measurement result of brain waves, and quantifies the reference pattern contained therein as an evaluation value relative to the index.

Figure 8:
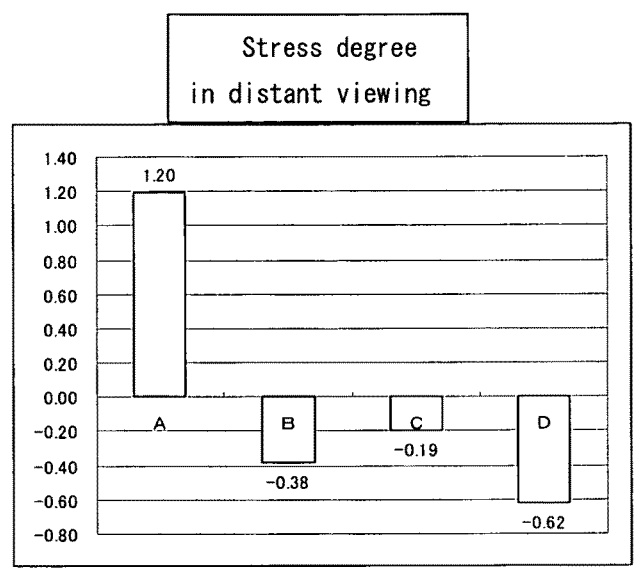
FIG. 8(a) is a graph showing an evaluation value of each lens of a "stress degree in distant viewing.
" and FIG. 8(b) is a graph showing an evaluation value of each lens of a "pleasure degree in distant viewing."
Figure 8:
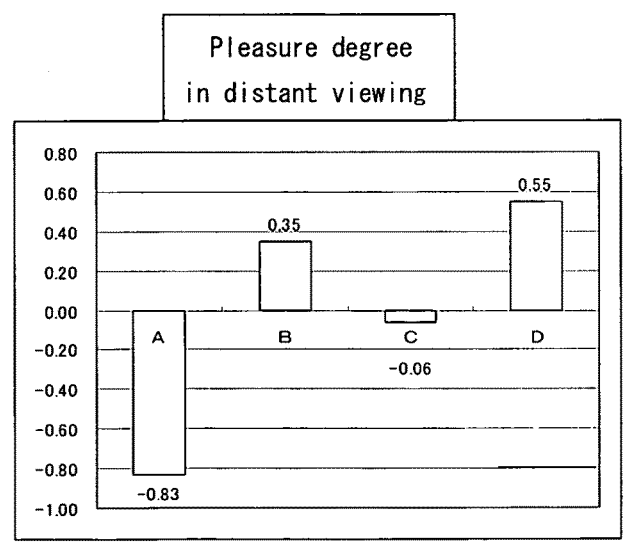

The "reference pattern of brain waves in a predetermined index" denotes a reference pattern standardized by repeatedly measuring brain waves in a specific sensation state by use of a plurality of subjects, and, in Embodiment 1, let it be supposed that two kinds of pieces of reference pattern data indexing a "state of being under stress" and a "state of being pleased," respectively, are prepared. The CPU 14 makes a comparison between reference pattern data and measured brain-wave data, and calculates an evaluation value relative to these indexes based on a difference with the reference pattern data. In Embodiment 1, with respect to each of the reference lens A and the to-be-evaluated lenses B to D, an individual evaluation value relative to thirty-seven subjects was calculated, and then the resulting evaluation values were normalized so that the mean became 0 and so that the variance became 1, and the normalized values were averaged. The result is shown in FIG. 8(a) and FIG. 8(b). In this data, a significant difference has been confirmed at a significance level of 5% in a variance analysis, and FIG. 8(a) shows that the lens becomes more excellent in proportion to a decrease in stress degree, whereas FIG. 8(b) shows that the lens becomes more excellent in proportion to an increase in pleasure degree.

4. Design of a New Lens Surface Shape Based on Evaluation Values

From FIG. 8(a) and FIG. 8(b), it is understood that, with respect to the to-be-evaluated lenses B to D, the evaluation value of the to-be-evaluated lens D becomes larger, and the evaluation value of the to-be-evaluated lens C becomes smaller than that of the design starting point (the to-be-evaluated lens B). This denotes that the evaluation value is increased if the shape change 2 (vector Dv) is given to the design starting point (to-be-evaluated lens B), which has been mentioned in the item "1. With respect to to-be-evaluated lenses," whereas the evaluation value is decreased if the shape change 1 (vector Cv) is given thereto. Accordingly, the evaluation value is quantified in the following manner. This makes it possible to arithmetically find a shape change (vector) that makes the evaluation value larger than that of the design starting point (to-be-evaluated lens B), and makes it possible to give feedback to the design of a lens surface shape.

(1) With respect to the to-be-evaluated lenses B to D, a difference between the evaluation values of the to-be-evaluated lenses B to D and that of the reference lens A is calculated. If a smaller value is preferable as an evaluation value, inversion is made between plus and minus.

In other words, inversion is made in the "stress degree in distant viewing" of FIG. 8(a), and the to-be-evaluated lens B becomes 1.58, the to-be-evaluated lens C becomes 1.39, and the to-be-evaluated lens D becomes 1.82, whereas the to-be-evaluated lens B becomes 1.18, the to-be-evaluated lens C becomes 0.77, and the to-be-evaluated lens D becomes 1.38 in the "pleasure degree in distant viewing" of FIG. 8(b). The numerical values mentioned here are standardized ones, and therefore there is no special unit.

(2) Weight is assigned to each of the two indexes. In Embodiment 1, let the weight of the "stress degree in distant viewing" equal 0.8, and let the weight of the "pleasure degree in distant viewing" equal 0.2. These weights can be arbitrarily changed.

Therefore, the evaluation values in total of the two indexes to each of which weight has been given are 1.58×0.8+1.18×0.2=1.500 in the to-be-evaluated lens B, 1.39×0.8+0.77×0.2=1.266 in the to-be-evaluated lens C, and 1.82×0.8+1.38×0.2=1.736 in the to-be-evaluated lens D.

(3) The relation of (vector Cv)=1.8×(vector Dv) exists between the shape change 1 and the shape change 2, which has been described in the item "1. With respect to to-be-evaluated lenses," and therefore the distance between the lens B and the lens C can be set as 1.8 under the condition that the lens B is placed at the origin, and the distance between the lens B and the lens D is 1.0. Herein, the "distance" denotes the degree of a gap between certain lens design and certain other lens design, and is defined by the direction and magnitude of a vector. In Embodiment 1, the vector Cv and the vector Dv are the same in direction, and therefore the distance is the magnitude of the vector.

Figure 9:
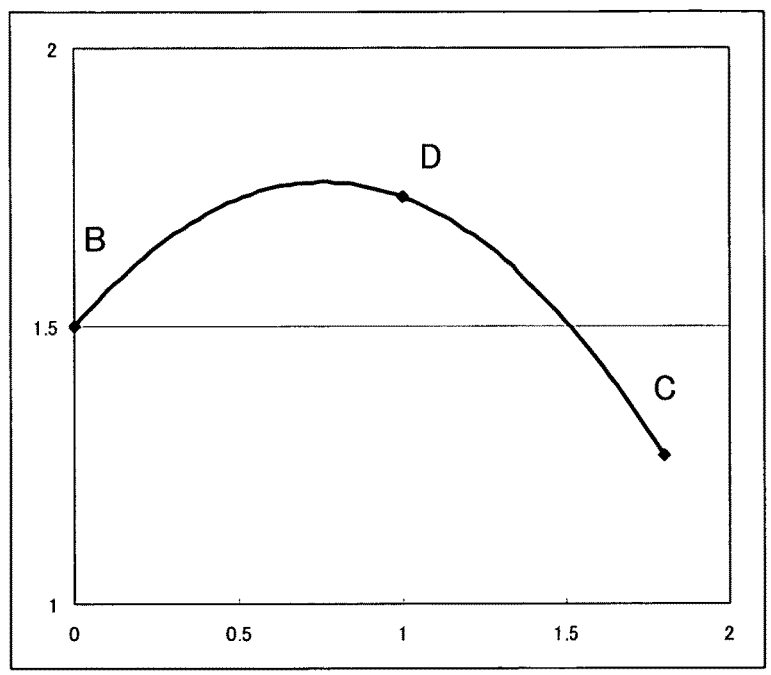
FIG. 9 is a graph showing a quadratic equation (second-degree equation) created by plotting a line including three points of to-be-evaluated lenses B to D and connecting these points together in which the to-be-evaluated lens B is set at an origin, in which a change in shape therefrom to the other to-be-evaluated lenses is set along an abscissa axis, and in which an evaluation value in total is set along an ordinate axis.

As shown in FIG. 9, this numerical value is set as a relative value along the abscissa axis, and the above-mentioned evaluation value in total is set along the ordinate axis, and a line including three points of the to-be-evaluated lenses B to D is plotted, and the distance from the lens B that takes a maximum value by a quadratic equation (i.e., second degree equation) that connects the three points together is calculated. As a result, the maximum value exists between the lens B and the lens D, and the distance from the lens B can be found to be 0.76.

Figure 10:
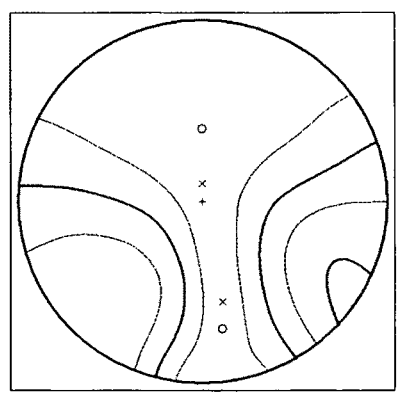
FIG. 10 is an aberration distribution diagram of a new lens E designed by adding an amount of difference change based on the evaluation value to the to-be-evaluated lens B.

(4) An interpolation calculation of the entire lens surface is performed by adding an amount of difference change of 0.76×(vector Dv) to the design B, and a new design E (FIG. 10) is obtained.

After the new design E is obtained in this way, a design F in which shape change 3 has been given to the design E and a design G in which shape change 4 has been given to the design E are created, and these three and the reference lens A are again subjected to the evaluation step for brain-wave measurement, and then an analysis is repeatedly performed, and, as a result, an objective sensation that can be efficiently obtained from the measurement of biological information can be reflected in design.

Embodiment 1 is an example performed when a plurality of monitor wearers (evaluators) at a lens development stage are subjects, and an objective sensation that can be efficiently obtained from the measurement of biological information can be reflected in the design of lens surfaces by repeatedly performing this design process.

On the other hand, if a subject is a person who desires to purchase spectacle lenses, biological information is collected at, for example, a spectacle-lens retail store or the department of ophthalmology in addition to each step of Embodiment 1, and this biological information or evaluation values obtained through the evaluation-value calculating step are sent to a lens maker or the like through a means of communication, such as the Internet, and the lens-surface-shape determining step is performed at the lens maker or the like based on the evaluation values. This process makes it possible to reflect an objective sensation obtained from the measurement of biological information of a person who desires to purchase spectacle lenses and who is a subject in design.

The following effects are achieved according to the structure of Embodiment 1.

(1) With respect to the to-be-evaluated lenses B to D, evaluation values relative to the two indexes of brain waves were calculated, and, from these evaluation values, more preferable design for the to-be-evaluated lenses B to D was converted into vectors and was fed back, and therefore it becomes possible to objectively reflect a monitor evaluation, which has not conventionally been able to be performed.

(2) The reference lens A of a differently-felt spectacles-wearing sensation showing a noticeable evaluation value was used as a lens to be compared with the to-be-evaluated lenses B to D, and therefore an evaluation can be advanced while confirming that the frequency of errors in measurement is low.

(3) Greater weight was set for an index (herein, the "stress degree in distant viewing") that is regarded as being higher in importance, and therefore the design policy of a designer can be reflected, and a lens closer to an ideal required of a progressive power lens can be designed by adopting a design concept of the designer while reflecting a monitor evaluation.

Embodiment 2

Measured values of an amount of oxygenated hemoglobin in the brain blood are used in a second embodiment (Embodiment 2), whereas brain waves are used as a source of the calculation of evaluation values in Embodiment 1. Additionally, a person desiring to purchase spectacles who comes to a spectacles retail store is a subject, and a spectacle lens is provided which reflects a sensation obtained by measuring the biological information of a person desiring to purchase spectacles who has come to the spectacles retail store in lens design in Embodiment 2, whereas a monitor wearer (evaluator) at a lens development stage is a subject in Embodiment 1.

1. With Respect to to-be-Evaluated Lenses

In this embodiment, three kinds of to-be-evaluated lenses J to L are used. Each of these lenses is a test lens of a progressive power lens whose for-far-vision part has a diopter power of S-0.00 D and which has an additional diopter power corresponding to an additional diopter power of a subject. The test lens is a lens prepared so that a person who desires to purchase spectacles virtually experiences a state of spectacles finished at, for example, a spectacles retail store, and is used in such a manner as to be laid on an S-diopter-power lens, a C-diopter-power lens, a prism lens, or the like in a trial frame. Unlike Embodiment 1, Embodiment 2 does not use a reference lens. A detailed description of the to-be-evaluated lenses is overlapped with that of Embodiment 1, and therefore is omitted. Among these lenses, the to-be-evaluated lens J is a design formed as a design starting point. With respect to the to-be-evaluated lenses K and L, the to-be-evaluated lens K is made by adding shape change 5 to the to-be-evaluated lens J, and the to-be-evaluated lens L is made by adding shape change 6 to the to-be-evaluated lens J. An amount of difference deformation to be added to the reference point of the to-be-evaluated lens J is vectorized, and the shape change 5 to be added to the lens J is set as Kv ($Ks_1$, $Ks_2$, $Ks_3$ ..., $Ks_n$), and the shape change 6 to be added thereto is set as Lv ($Ls_1$, $Ls_2$, $Ls_3$ ..., $Ls_n$) in the same way as in Embodiment 1.

2. Near-Infrared Spectrometer that Measures Oxygenated Hemoglobin in the Blood

In Embodiment 2, an amount of oxygenated hemoglobin in the blood in an activated part of the brain is measured by a near-infrared spectrometer. When a specific part of the brain is activated, the volume of blood flow to this specific part is increased, and the total amount of hemoglobin is increased. Additionally, when the specific part of the brain is activated, the amount of oxygenated hemoglobin is increased in the activated part, and the amount of deoxygenated hemoglobin is decreased therein. Therefore, to evaluate the lenses, the amount of oxygenated hemoglobin in the blood in an activated part of the brain of a subject is measured while using this physiological phenomenon.

Figure 13:
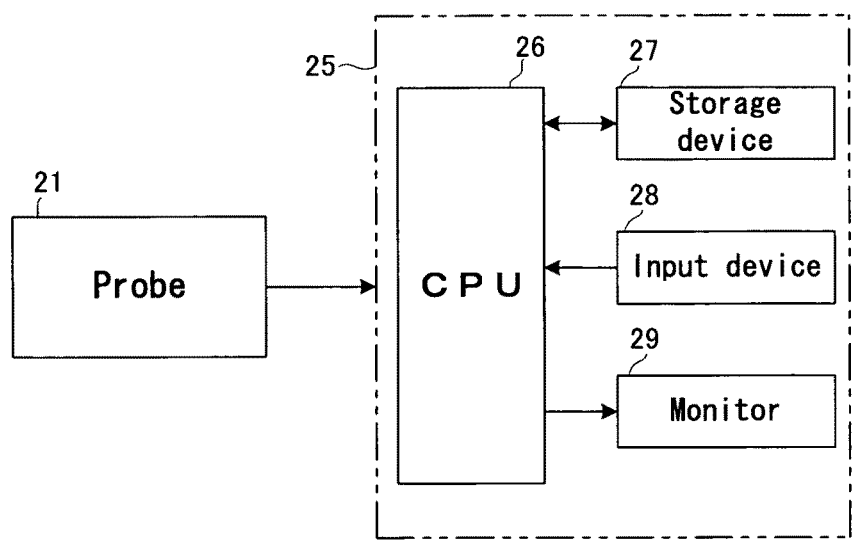
FIG. 13 is a block diagram for describing an electric structure of a near-infrared spectrometer used in a second embodiment.

The near-infrared spectrometer of Embodiment 2 has an electric structure shown in FIG. 13.

Figure 15:
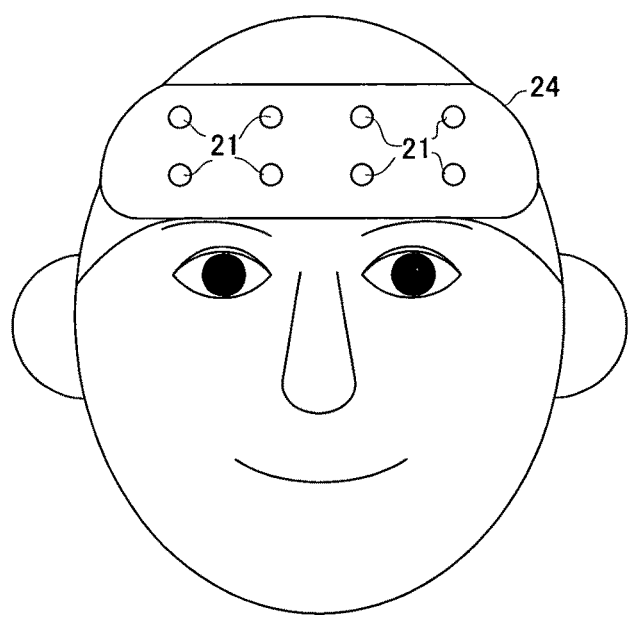
FIG. 15 is a descriptive view for describing a state in which a cuff provided with probes is mounted on a subject.
Figure 16:
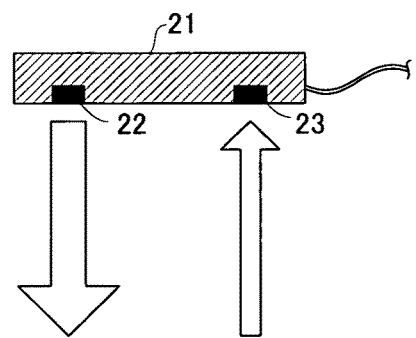
FIG. 16 is a schematic view of the probe used in the second embodiment.

As shown in FIG. 16, a probe 21 includes an LED light source 22 that serves as a light emitting part and a photo sensor 23 that serves as a light receiving part. A beam of near infrared light is emitted from the LED light source 22 toward the inside of the living body, and light that has passed through the inside of the living body, that has been scattered, and that has been attenuated is detected by the photo sensor 23. In Embodiment 2, let it be supposed that a cuff 24 to which probes 21, the number of which is four in the horizontal direction and two in the vertical direction, have been attached is used, and is mounted on the head of a person in such a manner as to cover a prefrontal area of the brain therewith for measurement as shown in FIG. 15. The prefrontal area is a part that controls mental activity relative to the control of memory, emotion, and action in the brain. Therefore, this area is a place at which a difference in viewing through a lens is most actively reflected in the brain in the form of increase or decrease in the amount of oxygenated hemoglobin.

Near infrared light measured by the probes 21 is output to an analysis computer 25. The analysis computer 25 is composed of a CPU (central processing unit) 26, a storage device 27, and peripheral devices. In addition, the analysis computer 25 includes an input device 28, a monitor 29, and so on. These can be described correspondingly to the analysis computer 13 of Embodiment 1, and therefore a detailed description thereof is omitted.

Figure 14:
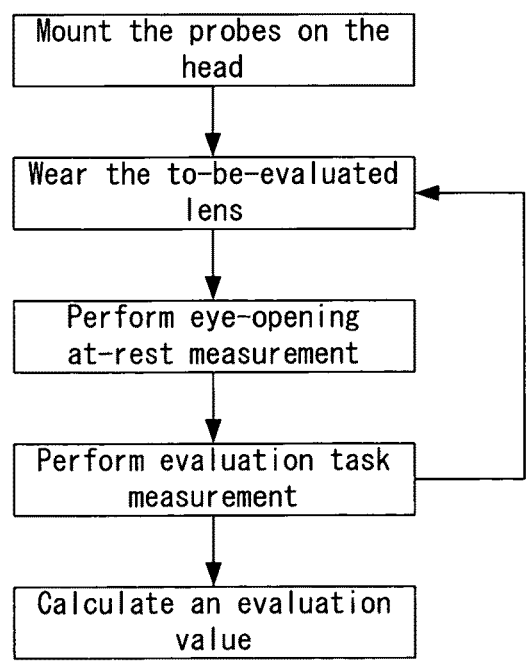
FIG. 14 is a flowchart for describing the flow of an evaluation technique that uses the near-infrared spectrometer.

3. Measurement of Oxygenated Hemoglobin in the Blood—Calculation of Evaluation Values Next, an evaluation technique that uses the near-infrared spectrometer will be described with reference to FIG. 14.

First, the cuff 24 to which the probes 21 have been attached is mounted on a subject so that near infrared light is emitted from the LED light source 22 toward the inside of the brain as shown in FIG. 15.

Thereafter, one kind of to-be-evaluated lens is set in a trial frame together with S diopter power, C diopter power, prism diopter power, etc., of the subject, and the subject wears this trial frame.

With respect to measurement, eye-opening at-rest measurement (about 30 seconds) and evaluation task measurement (about 30 seconds) are continuously performed, and, immediately after the end of the measurement of the to-be-evaluated lens J, the subject is allowed to wear the to-be-evaluated lens K, and a loop of the flowchart is repeatedly performed in the repetition manner of eye-opening at-rest measurement, evaluation task measurement, . . . until all of the to-be-evaluated lenses end their roles. In Embodiment 2, in order to evaluate a spectacles-wearing sensation of the for-near-vision part of the progressive power lens, the evaluation task allows the subject to view indexes for evaluation placed close to subject's hands. Preferably, in order to reduce the burden of the subject and to obtain an accurate measurement result, an eye-opening at-rest measurement time and an evaluation task measurement time are set to be as short as possible.

The order in which the to-be-evaluated lenses are mounted may be random among the lenses J to L. Preferably, if measurement is performed a plurality of times or if measurement is performed by using a plurality of subjects, the order of evaluation is made random in each measurement, because an influence exerted by the order of measurement can be canceled.

Figure 18:
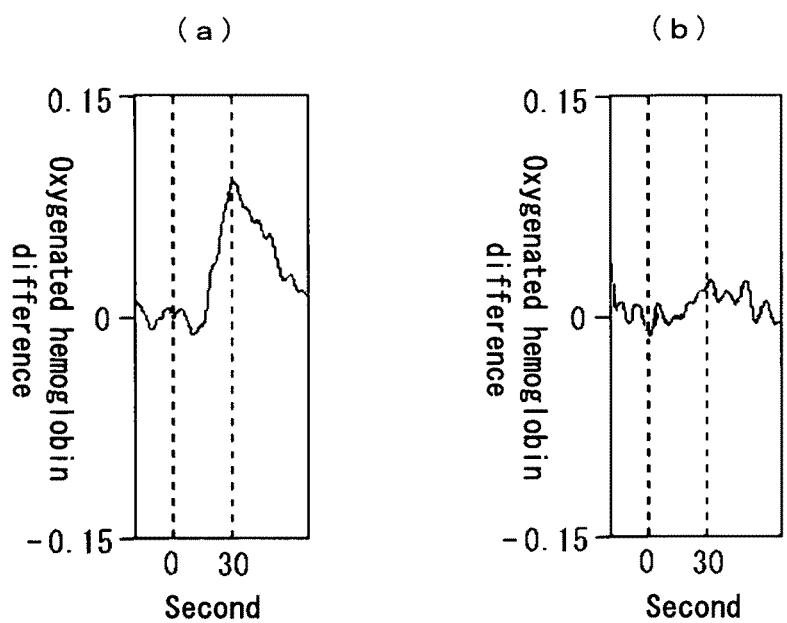
FIG. 18(a) is a graph showing a result obtained by subtracting an amount of oxygenated hemoglobin of a to-be-evaluated lens J from an amount of oxygenated hemoglobin of a to-be-evaluated lens K in the second embodiment.
FIG. 18(b) is a graph showing a result obtained by subtracting an amount of oxygenated hemoglobin of the to-be-evaluated lens J from an amount of oxygenated hemoglobin of a to-be-evaluated lens L in the second embodiment.

In measurement, under the condition that an eye-opening at-rest state is defined as a stationary state (i.e., as a zero point) with respect to the to-be-evaluated lenses J to L, the amount of oxygenated hemoglobin, the amount of deoxygenated hemoglobin, and the amount of all hemoglobin are measured in evaluation task measurement performed when each lens is worn, and a difference spectrum between the lens K and the lens J and a difference spectrum between the lens L and the lens J are calculated, and a difference of the difference spectrum in the amount of oxygenated hemoglobin is shown in FIGS. 18(a) and 18(b) relative to a probe that has most conspicuously reflected a difference in performance among the lenses.

Figure 17:
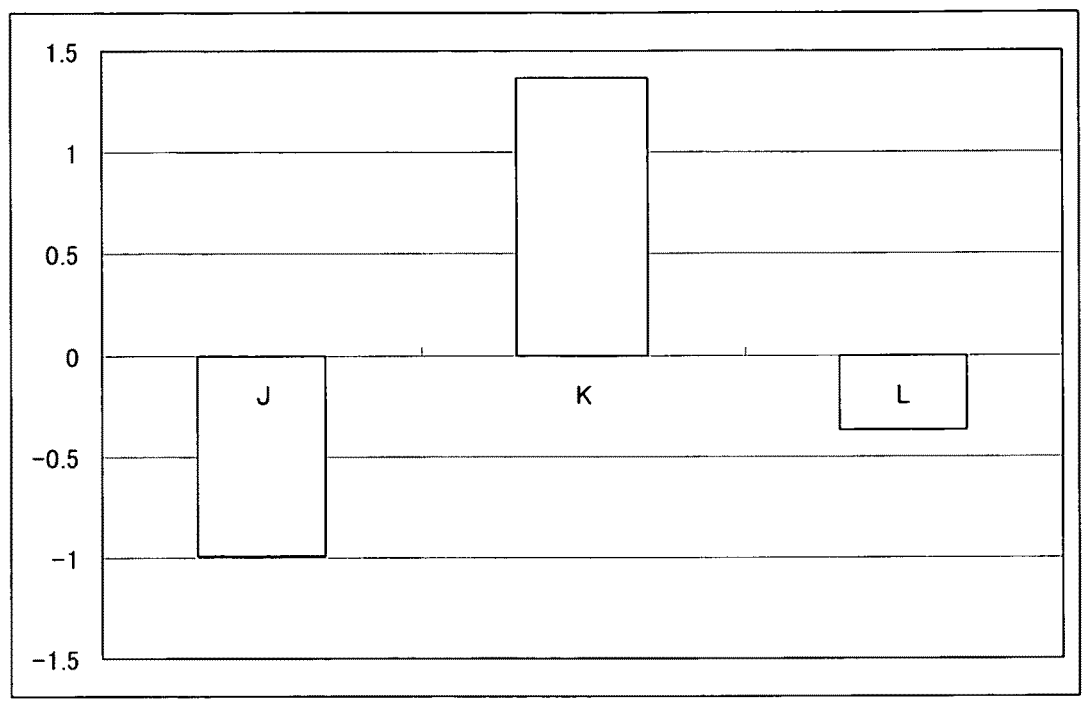
FIG. 17 is a graph showing an evaluation value of each lens of a "stress degree in near viewing."

In Embodiment 2, with respect to the to-be-evaluated lenses J to L, evaluation values are shown in FIG. 17 by normalizing the values of the amount of change in oxygenated hemoglobin obtained after 30 seconds so that the mean becomes 0 and so that the variance becomes 1 in the same way as in Embodiment 1. FIG. 17 indicates that a burden on a part of the brain on which probes are mounted becomes smaller in proportion to a decrease in value when the evaluation task is performed, i.e., FIG. 17 indicates that the lens is smaller in stress degree in proportion to a decrease in value when the evaluation task is performed.

4. Design of New Lens Surface Shapes Based on Evaluation Values

Figure 12:
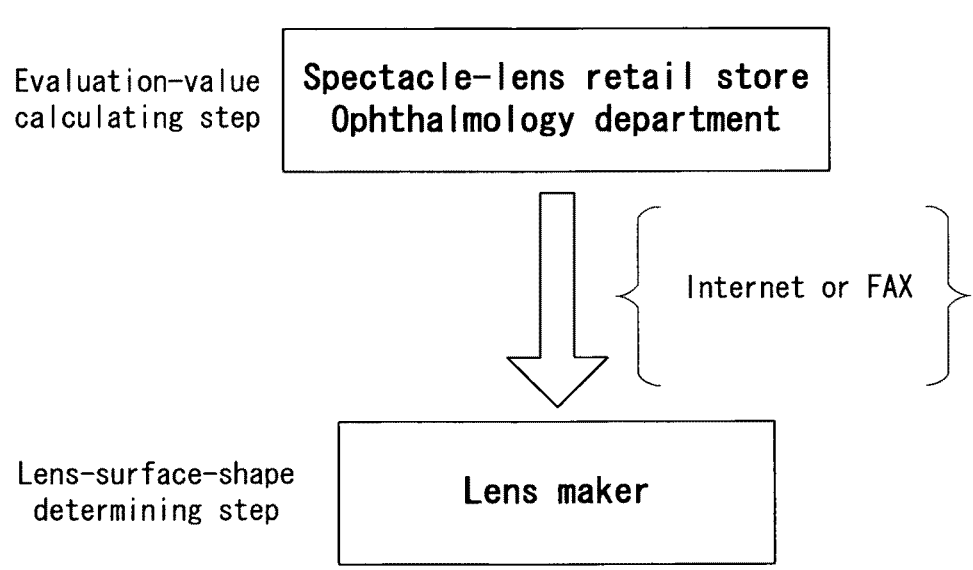
FIG. 12 is a flowchart for describing the fact that an evaluation-value calculating step and a lens-surface-shape determining step are divided from each other in the embodiment of the present invention and the fact that data is sent and received via the Internet or a FAX machine.

As shown in FIG. 12, in Embodiment 2, the evaluation-value calculating step is performed at a spectacle-lens retail store or the like, and evaluation values obtained in FIG. 17 are transmitted to a lens maker through a means of communication, such as the Internet or a FAX machine, and the lens-surface-shape determining step is performed at the lens maker.

As a result of comparisons between the to-be-evaluated lenses J to L, it is understood from FIG. 17 that the to-be-evaluated lens L is slightly inferior in evaluation value to the to-be-evaluated lens J, and the to-be-evaluated lens K is vastly inferior in evaluation value to the to-be-evaluated lens J in the index of "stress degree." From this fact, an optimal design exists near the to-be-evaluated lens J, and an optimal difference vector can be obtained by correlating the data of FIG. 17 with the difference vectors Kv and Lv according to the same technique as that of Embodiment 1, and a design that reflects the sensation of a subject can be created by adding this optimal difference vector to the to-be-evaluated lens J. Additionally, spectacle lenses that reflect the sensation of a person who desires to purchase spectacle lenses and who has become a subject can be provided by producing lenses designed in that manner at a lens maker and by providing these lenses to a spectacles retail store.

The following effects are achieved according to the structure of Embodiment 2.

(1) With respect to the to-be-evaluated lenses J to L, evaluation values were calculated by using oxygenated hemoglobin and by setting the stress degree measured when viewing through a for-near-vision part of the lens is performed as an index, and, from these evaluation values, more preferable design for the to-be-evaluated lenses J to L was converted into vectors and was fed back, and therefore it becomes possible to objectively reflect a monitor evaluation, which has not conventionally been able to be performed.

(2) If a subject is a person who desires to purchase spectacle lenses, it becomes possible to design, produce, and provide spectacle lenses that reflect a sensation felt when this person wears spectacles in lens design.

The present invention can also be modified and embodied as follows.

Although a new lens showing a more suitable evaluation value is designed from the to-be-evaluated lenses B to D and J to L, and, as a result, a suitable lens surface shape based on the above-mentioned indexes is determined in the above-mentioned embodiments, an optimal to-be-evaluated lens may be selected from already-made to-be-evaluated lenses based on evaluation values, and a suitable lens surface shape may be determined based on that. For example, the to-be-evaluated lenses J to L are examined in Embodiment 2.

FIG. 18(a) is a graph in which a measured value of the to-be-evaluated lens J has been subtracted from that of the to-be-evaluated lens K. FIG. 18(b) is a graph in which a measured value of the to-be-evaluated lens J has been subtracted from that of the to-be-evaluated lens L. From a comparison between these graphs in both of which the ordinate axis is positive during evaluation task measurement, it is understood that a value, especially of FIG. 18(a), which was obtained when an evaluation task was performed for measurement sharply rises. From this fact, it is understood that, when spectacles-wearing sensations of the for-near-vision parts are compared with each other in the three to-be-evaluated lenses J to L, the lens J is most preferred, and the lens L is slightly inferior to the lens J, and the lens K is worst. According to this evaluation technique, the lens J can be determined to be suitable among the to-be-evaluated lenses J to L, and can be adopted as an optimal spectacle lens, and can be set as a starting lens.

In Embodiment 1, the to-be-evaluated lenses are subjected to three-point plotting, and their characteristics are shown by a second degree equation. Although a second degree equation (or an n-th degree equation ("n" is two or larger)) that has a maximum value can be easily formed if the number of points is three, approximated points can also be used if an n-th degree equation that has a maximum value is formed by using three or more points. Additionally, an approximated curve for obtaining a maximum value is not limited to a second degree equation (or n-th degree equation).

Figure 19:
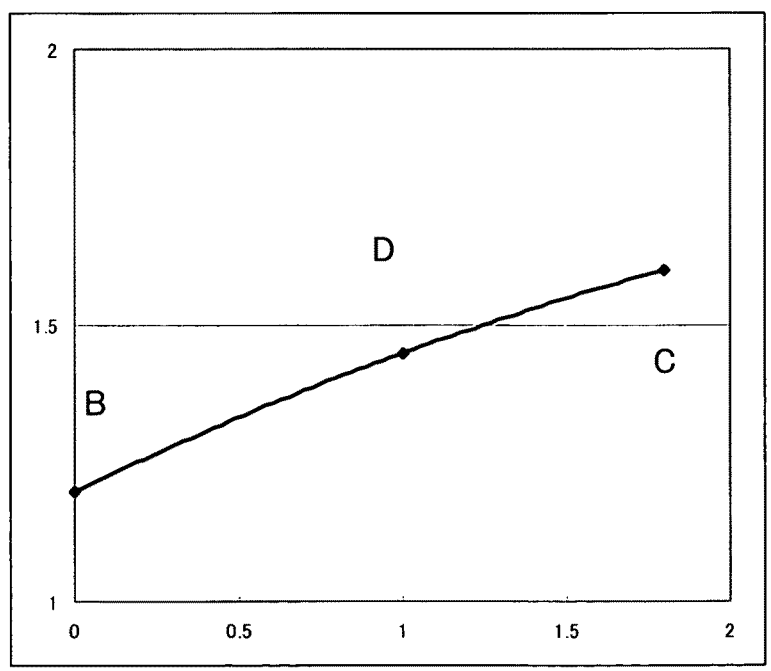
FIG. 19 is a graph showing a quadratic equation created by plotting a line including three points of to-be-evaluated lenses B to D and connecting these points together in which the to-be-evaluated lens B is set at an origin, in which a change in shape to each to-be-evaluated lens is set along an abscissa axis, and in which an evaluation value in total is set along an ordinate axis in another embodiment.

A second degree equation that has a maximum value can be obtained as in Embodiment 1, and, if a plotted point-line monotonously increases as in, for example, FIG. 19, new points to be fed back toward design so as to select design (design C in FIG. 19) that has been most highly evaluated can be freely arranged.

Although two indexes obtained from a brain wave analysis are used as the axis of evaluation in Embodiment 1, a conventional subjective monitor questionnaire can be represented by points according to, for example, an SD method, and those points can also be regarded as a factor to be fed back to design.

Although brain waves or an amount of oxygenated hemoglobin in the brain blood is used as biological information in Embodiment 1, a plurality of pieces of biological information, such as brain waves and a blink, can be measured, and these pieces of biological information can be weighted, and data processing can be performed in the same way as in Embodiment 1. The thus obtained data can also be used as a factor to be fed back to design.

Although shape change 1 (vector Cv) and shape change 2 (vector Dv) each of which is represented as an amount of difference change are set to be vectors having the same direction in Embodiment 1 in order to intelligibly describe an analysis technique, the vectors between their lenses are not necessarily required to have the same direction. If the vectors do not have the same direction, the abscissa axis will be used as a conceivable means for vectors in FIG. 10.

Although the four kinds of to-be-evaluated lenses are continuously measured at a time in Embodiment 1, the lenses may be measured according to a method in which the lenses are measured in the form of a pair of lenses, i.e., in the form of the reference lens A and the pair to the reference lens A, such as the reference lens A and the to-be-evaluated lens B, the reference lens A and the to-be-evaluated lens C, or the reference lens A and the to-be-evaluated lens D, and a difference in measured value with the reference lens A is analyzed as the lens performance of the to-be-evaluated lenses B to D.

In the reference lens, the fact that it is confirmed that a spectacles-wearing sensation is different is important, and therefore, for example, if the to-be-evaluated lens is a progressive power lens, a monofocal lens may be selected as the reference lens, or a lens having a diopter power of 0 may be selected.

Although the to-be-evaluated lenses (and the reference lens in Embodiment 1) of each embodiment mentioned above have the same diopter power, lenses that differ in diopter power from each other may be used as to-be-evaluated lenses. For example, Embodiment 2 includes to-be-evaluated design differing in additional diopter power.

Although a vector theory is used in the above-mentioned embodiment in order to define an amount of difference deformation, it is also possible to make a conversion into a determinant in an actual calculation.

Although an amount of oxygenated hemoglobin is used as biological information in Embodiment 2, it is also possible to use an amount of deoxygenated hemoglobin or an amount of all hemoglobin (total amount) simultaneously measured. The amount of deoxygenated hemoglobin is relatively decreased by an increase in the amount of oxygenated hemoglobin, and therefore the amount of deoxygenated hemoglobin can also be used as a value measured by a near-infrared spectrometer instead of the amount of deoxygenated hemoglobin. Additionally, the total amount of hemoglobin in the brain blood is increased or decreased depending on an environment in which evaluation task measurement is performed as in the above-mentioned embodiment, and therefore this total amount of hemoglobin can be measured by the near-infrared spectrometer, and evaluation values can be calculated and used based on the total amount of hemoglobin that is subject to conditions.

Although an amount of oxygenated hemoglobin is used as biological information in Embodiment 2, two or more of the amount of deoxygenated hemoglobin and the amount of all hemoglobin (total amount) measured simultaneously with the amount of oxygenated hemoglobin can be employed as biological information, and evaluation values can also be calculated and used based on, for example, a change in the ratio of an amount of deoxygenated hemoglobin to an amount of oxygenated hemoglobin or a change in the ratio of an amount of deoxygenated hemoglobin to an amount of all hemoglobin.

In Embodiment 2, a predetermined parameter, such as an integral value or a maximum value in a task, can be used as another example of the evaluation value.

With respect to other examples, the present invention can be freely embodied in a mode not departing from the gist of the present invention.

The invention claimed is:

1. A method for designing spectacle lenses, the method comprising:
an evaluation-value calculating step of preparing a plurality of to-be-evaluated lenses for lens surface design performed differently from each other, thereafter measuring predetermined biological information of a subject for each of the to-be-evaluated lenses by allowing the subject to wear each of the to-be-evaluated lenses, wherein the predetermined biological information is brain waves, and calculating an evaluation value of each of the to-be-evaluated lenses with respect to a predetermined index in the brain waves; and
a lens-surface-shape determining step of calculating a correlation between an evaluation value of each of the to-be-evaluated lenses calculated in the evaluation-value calculating step and a lens surface shape of each of the to-be-evaluated lenses as an index characteristic, and determining a lens surface shape of a spectacle lens suitable in the index based on the index characteristic.

2. The method for designing spectacle lenses according to claim 1, wherein one of the plurality of to-be-evaluated lenses has a lens surface shape determined in the lens-surface-shape determining step.

3. The method for designing spectacle lenses according to claim 2, wherein a plurality of indexes each of which is defined in claim 1 is prepared, and a specific weight is assigned to an evaluation value obtained in each of the indexes.

4. The method for designing spectacle lenses according to claim 3, wherein, when an index characteristic is calculated in the lens-surface-shape determining step, a value obtained by normalizing an evaluation value of each of the to-be-evaluated lenses calculated in the evaluation-value calculating step is used.

5. The method for designing spectacle lenses according to claim 4, wherein an evaluation value is calculated relative to a reference lens having a differently-felt spectacles-wearing sensation in which a noticeable evaluation value is obtained in comparison with the to-be-evaluated lenses in the evaluation-value calculating step, and the evaluation value of the reference lens is set as a reference value in the lens-surface-shape determining step.

6. The method for designing spectacle lenses according to claim 5, wherein a design starting lens is set, thereafter a difference in shape between each of the to-be-evaluated lenses and the design starting lens is calculated as a difference vector in the evaluation-value calculating step, and, based on this difference vector and based on an evaluation value calculated relative to a predetermined index in the evaluation-value calculating step, a difference vector whose evaluation value becomes larger than that of the design starting lens is calculated, and an amount of change corresponding to the difference vector is combined with the design starting lens.

7. The method for designing spectacle lenses according to claim 6, wherein the difference vector whose evaluation value becomes larger than that of the design starting lens is an optimal difference vector whose evaluation value in the index becomes a maximum value.

8. The method for designing spectacle lenses according to claim 7, wherein the design starting lens with which an amount of change corresponding to its difference vector has been combined is set as a new design starting lens.

9. The method for designing spectacle lenses according to claim 8, wherein the spectacle lens is a progressive power lens.

10. The method for designing spectacle lenses according to claim 8, wherein the subject is a person who desires to purchase spectacle lenses, and the biological information is measured at the spectacle-lens retail store or at an ophthalmology department.

11. The method for designing spectacle lenses according to claim 10, wherein the biological information measured at the spectacle-lens retail store or at the ophthalmology department is transmitted to a lens processing place through a means of communication, and the lens-surface-shape determining step is performed at the lens processing place.

12. The method for designing spectacle lenses according to claim 10, wherein the evaluation-value calculating step is performed with respect to the biological information measured at the spectacle-lens retail store or at the ophthalmology department, thereafter a resulting evaluation value is transmitted to the lens processing place through a means of communication, and the lens-surface-shape determining step is performed at the lens processing place.

13. A method for designing spectacle lenses, the method comprising:
    an evaluation-value calculating step of preparing a plurality of to-be-evaluated lenses for lens surface design performed differently from each other, thereafter measuring predetermined biological information of a subject for each of the to-be-evaluated lenses by allowing the subject to wear each of the to-be-evaluated lenses, wherein the predetermined biological information is at least one selected from an amount of oxygenated hemoglobin in brain blood, an amount of deoxygenated hemoglobin in the brain blood, and an amount of all hemoglobin in the brain blood, and calculating an evaluation value of each of the to-be-evaluated lenses with respect to a predetermined index in the biological information; and
    a lens-surface-shape determining step of calculating a correlation between an evaluation value of each of the to-be-evaluated lenses calculated in the evaluation-value calculating step and a lens surface shape of each of the to-be-evaluated lenses as an index characteristic, and determining a lens surface shape of a spectacle lens suitable in the index based on the index characteristic.

14. The method for designing spectacle lenses according to claim 13, wherein one of the plurality of to-be-evaluated lenses has a lens surface shape determined in the lens-surface-shape determining step.

15. The method for designing spectacle lenses according to claim 14, wherein a plurality of indexes each of which is defined in claim 1 is prepared, and a specific weight is assigned to an evaluation value obtained in each of the indexes.

16. The method for designing spectacle lenses according to claim 15, wherein, when an index characteristic is calculated in the lens-surface-shape determining step, a value obtained by normalizing an evaluation value of each of the to-be-evaluated lenses calculated in the evaluation-value calculating step is used.

17. The method for designing spectacle lenses according to claim 16, wherein an evaluation value is calculated relative to a reference lens having a differently-felt spectacles-wearing sensation in which a noticeable evaluation value is obtained in comparison with the to-be-evaluated lenses in the evaluation-value calculating step, and the evaluation value of the reference lens is set as a reference value in the lens-surface-shape determining step.

18. The method for designing spectacle lenses according to claim 17, wherein a design starting lens is set, thereafter a difference in shape between each of the to-be-evaluated lenses and the design starting lens is calculated as a difference vector in the evaluation-value calculating step, and, based on this difference vector and based on an evaluation value calculated relative to a predetermined index in the evaluation-value calculating step, a difference vector whose evaluation value becomes larger than that of the design starting lens is calculated, and an amount of change corresponding to the difference vector is combined with the design starting lens.

19. The method for designing spectacle lenses according to claim 18, wherein the spectacle lens is a progressive power lens.

* * * * *